(12) United States Patent  
Mainzer

(10) Patent No.: US 7,886,773 B2
(45) Date of Patent: Feb. 15, 2011

(54) LOW PRESSURE DIRECTIONAL STOP BYPASS DEVICE

(75) Inventor: Jeffrey William Mainzer, Cary, IL (US)

(73) Assignee: Operations Technology Development, NFP, Des Plaines, IL (US)

( * ) Notice: Subject to any disclaimer, the term of this patent is extended or adjusted under 35 U.S.C. 154(b) by 372 days.

(21) Appl. No.: 12/176,575

(22) Filed: Jul. 21, 2008

(65) Prior Publication Data

US 2010/0012199 A1 Jan. 21, 2010

(51) Int. Cl.
*F16L 55/12* (2006.01)
(52) U.S. Cl. .............................. 138/93; 138/94; 138/97; 137/318; 137/15.15
(58) Field of Classification Search ................... 138/90, 138/93, 94, 97, 98; 137/318, 15.15, 15.17
See application file for complete search history.

(56) References Cited

U.S. PATENT DOCUMENTS

| 1,760,750 | A |   | 5/1930  | Goodman ................... 138/93 |
| 1,833,700 | A | * | 11/1931 | Wolf .......................... 29/213.1 |
| 1,946,138 | A |   | 2/1934  | Gardner ...................... 138/93 |
| 3,032,069 | A | * | 5/1962  | Ficklin ........................ 138/89 |
| 3,842,864 | A | * | 10/1974 | Riegel et al. .................. 138/93 |
| 4,155,373 | A |   | 5/1979  | DiGiovanni .............. 137/15.15 |
| 4,291,727 | A | * | 9/1981  | Yie et al. ...................... 138/93 |
| 5,439,032 | A | * | 8/1995  | Petrone ........................ 138/93 |
| 5,511,578 | A |   | 4/1996  | Wagner ................. 137/315.42 |
| 5,524,661 | A | * | 6/1996  | Tigerholm ............... 137/15.15 |
| 5,590,676 | A |   | 1/1997  | Wagner ................... 138/15.18 |
| 5,778,919 | A |   | 7/1998  | Petrone ................... 137/15.08 |
| 5,791,364 | A | * | 8/1998  | Petrone ................... 137/15.15 |
| 5,934,304 | A |   | 8/1999  | Peterson et al. |
| 6,446,662 | B1 |  | 9/2002  | Wagner ................... 137/15.08 |

* cited by examiner

*Primary Examiner*—Patrick F Brinson
(74) *Attorney, Agent, or Firm*—Mark E. Fejer

(57) ABSTRACT

A low pressure directional stop bypass device including a saddle fitting having an axially extending tubular connection element having a connection element wall forming a lateral bypass port, a valve assembly connected with the axially extending tubular connection element having a first valve port in fluid communication with the lateral bypass port and having a second valve port, and a stuffing box connected with the second valve port. A launch tube assembly is inserted through the stuffing box and the valve assembly into the axially extending tubular connection element. The launch tube element includes an outer tubular member, an inner tubular member disposed within the outer tubular member, and a stopper supply tube having a leading end and a trailing end and disposed within the inner tubular member. A flexible inflatable stopper plug connected with the leading end of the stopper supply tube. Connected with the outlet end of the outer tubular member is at least one guidance pin which ensures insertion of the flexible inflatable stopper plug into a pipe fitted with the saddle fitting in a predetermined direction.

9 Claims, 7 Drawing Sheets

LOW PRESSURE DIRECTIONAL STOP BYPASS DEVICE

BACKGROUND OF THE INVENTION

1. Field of the Invention

This invention relates to an apparatus and method for change out, i.e. removal and reinstallation, of natural gas meters typically employed in residential and commercial settings without interrupting the gas service to the natural gas consumer.

2. Description of Related Art

State Public Service Commissions require natural gas utilities to exchange residential and commercial meter sets for various reasons every 7-10 years, typically based upon state mandated sampling programs. Some of the reasons for this requirement include leaks reported by the consumer, requirements of corporate policies, exchanges mandated by regulatory bodies, tampering, lot failure programs, and those reported to be reading incorrectly. The current method for exchanging these meters requires a service technician to shut off the flow of gas to the consumer, thereby interrupting the service to the consumer. As part of the exchange, the service technician must enter the premises of the consumer to ensure that all gas appliances are operating properly. At the same time, safety inspections are performed. The total time to complete the exchange at the consumer's premises is approximately 40 minutes, and there is the potential for appliance malfunction requiring the repair of the appliance at the utilities' expense. Not only is this an inconvenience to the consumer whose service is interrupted, but also the interaction with the consumer and the subsequent re-lighting of gas appliances significantly reduces the efficiency of the service technician. Thus, due to consumer inconvenience and the substantial costs to the utilities associated with exchanging meters, it is apparent that a method and apparatus for exchanging a meter without interrupting the flow of gas is highly desirable. In addition, such a method and apparatus would enable concurrent replacement of regulators and service valves, which fail due to corrosion, age, and ice encroachment.

The typical gas meter comprises upward extending, threaded inlet and outlet openings connected by means of inlet and outlet swivels to a meter bar having a gas inlet end and a gas outlet end. The outlet opening is connected with a service line or pipe which runs between the meter outlet and the customer facility. Thus, to change out the meter without interrupting service to the customer requires the maintaining of gas flow through the service line while gas flow through the meter is stopped.

The use of inflatable gas pipeline stoppers or bags for interrupting the flow of gas through a pipeline or service line is well established. Such stoppers are typically employed for temporarily interrupting the flow of gas (or water) through the pipeline or service line while repairs to the pipeline or service line are effected. See, for example, U.S. Pat. No. 1,760,750 to Goodman which teaches a flexible inflatable stopper for gas and water mains that forms a complete closure for the main. In addition, if the stopper buckles or otherwise becomes deformed upon insertion, the placement of the closure will not be prevented. U.S. Pat. No. 1,946,138 to Gardner teaches a pneumatic stopper for a gas pipe including an air bag for stopping the pipe. The device includes a tubular housing and an inflatable bag, interconnected with an air tube which extends within the tubular housing. The air tube and bag may be moved downward with respect to the tubular housing to extend into the pipe after the housing has been threadably attached to the pipe. The air bag may then be inflated to stop flow within the pipe. And, U.S. Pat. No. 3,824,864 to Reigel et al. Teaches a line stopper comprising a housing that is mountable to a conventional pipe tapping machine and a bag insertion assembly mounted in the housing. The insertion assembly includes a slidable insertion tube and an inflatable bag connected at the lower end thereof. The bag includes a rigid neck connected by a knuckle means to the insertion tube to enable the bag to be pivoted into the pipe. The housing is secured to the valve assembly by two pairs of ears which extend outward from the base and which are clamped to the valve assembly by bolts. When the bag is placed in the pipe, the insertion tube covers the edge of the hole in the pipe to prevent abrasion between the bag and the edge of the hole in the pipe. Although each of the prior art devices stops fluid flow within the pipe into which it is inserted, none of the prior art devices provides any means for maintaining flow to a user during the repair process.

It will be appreciated that the direction of the inflatable stopper within the pipe is critical to the success of the repair or other operation being performed. Thus, it is critically important to be able to ensure that the stopper is inserted in the desired direction within the pipe. U.S. Pat. No. 5,439,032 to Petrone teaches an inflatable gas pipeline stopper apparatus including an elongated cylindrical stopper housing for attachment to a gas pipeline using a drilling and tapping machine or air tight clamp assembly and a pair of moveable bag inserting and retracting plunger assemblies including rigid air pipes which are attached to an air source at the upper ends thereof and to the inflatable bags at the bottom ends thereof disposed within the stopper housing. The plunger assemblies are inserted through the stopper housing to extend into the gas pipeline such that one air bag is pointed in an upstream direction within the gas pipeline and the other air bag is directed to a downstream location of the gas pipeline. The bags are indicated to be directional in nature, having a rigid member within the air bag for pointing the air bag in a desired direction. Directional indicators are provided on the moveable bag inserting and retracting plunger assemblies to indicate the direction that the bags are pointed.

Notwithstanding the fact that directional inflatable bags may be designed for insertion in a desired direction, experiments that I have conducted have shown that such bags do not always go into the pipe in the indicated direction. Accordingly, there is a need for a flexible inflatable bag insertion apparatus which precludes insertion of the bags into the pipe in the wrong direction.

SUMMARY OF THE INVENTION

It is, thus, one object of this invention to provide an apparatus and method for removing and replacing a gas meter and/or other equipment, such as regulators and service valves, while maintaining continuous gas flow to the customer.

It is another object of this invention to provide an apparatus and method for repairing a utility pipe without interrupting flow to the customer.

These and other objects of this invention are addressed by a low pressure directional stop bypass apparatus comprising a saddle fitting having an axially extending tubular connection element having a bypass port. A valve assembly having a first valve port in fluid communication with the bypass port and having a second valve port is connected with the axially extending tubular connection element, and a stuffing box is connected with the second valve port. The apparatus further comprises a launch tube assembly inserted through the stuffing box and the valve assembly into the axially extending tubular connection element. The launch tube assembly comprises fluid communication means for providing fluid communication between the interior of the launch tube assembly and the bypass port. Flow stopping means are provided for stopping flow of a fluid flowing through a pipe to which the saddle fitting is connected. The flow stopping means comprises stoppage means for ensuring stoppage of the fluid flow upstream of the saddle fitting, which requires that the stoppage means are always inserted into the pipe upstream of the saddle fitting.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The apparatus of this invention is a component of a system employable for removing a gas meter from an active service line providing gas to a customer without interrupting the flow of gas to the customer. The system utilizes a flexible inflatable stopper disposed in the service line as a means for stopping the normal flow of gas exiting the gas meter. It will be appreciated by those skilled in the art that insertion of the flexible inflatable stopper into the service line requires the creation of an opening in the service line through which the stopper may be inserted into the service line prior to inflation. The steps and tools employed for tapping into the service line are well known to those skilled in the art and such steps and tools by themselves are not deemed to be elements of the method and apparatus of this invention. That is, methods for tapping into a pipeline through which a fluid is flowing generally employ a fitting disposed around the area of the pipeline into to which the opening is made, a tool for cutting an opening in the pipeline which does not allow fluid to escape from the pipeline during the cutting operation, and additional tools for further refinement of the opening, such as threading of the opening, to permit accommodation of the desired addition to the pipeline system, such as the addition of a service branch. It will be appreciated that the apparatus of this invention may be employed in connection with any fluid metering system in which it is desired to remove the metering component without interrupting the flow of the fluid downstream of the metering component, and such applications are deemed to be within the scope of this invention. Exemplary of such a system is a water utility system.

Figure 1:
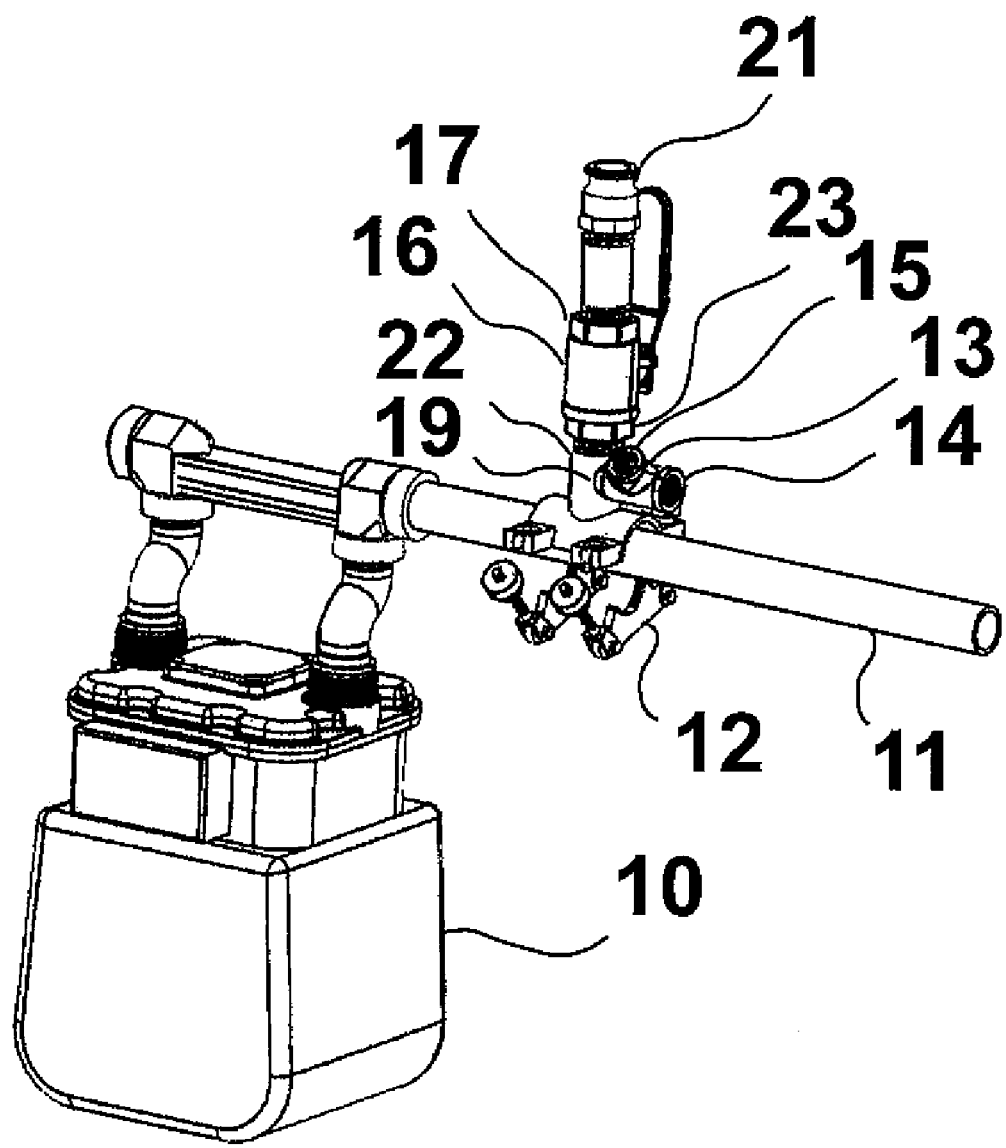
FIG. 1 is a diagram showing a gas meter and a portion of the apparatus in accordance with one embodiment of this invention disposed around a service pipeline.
Figure 2:
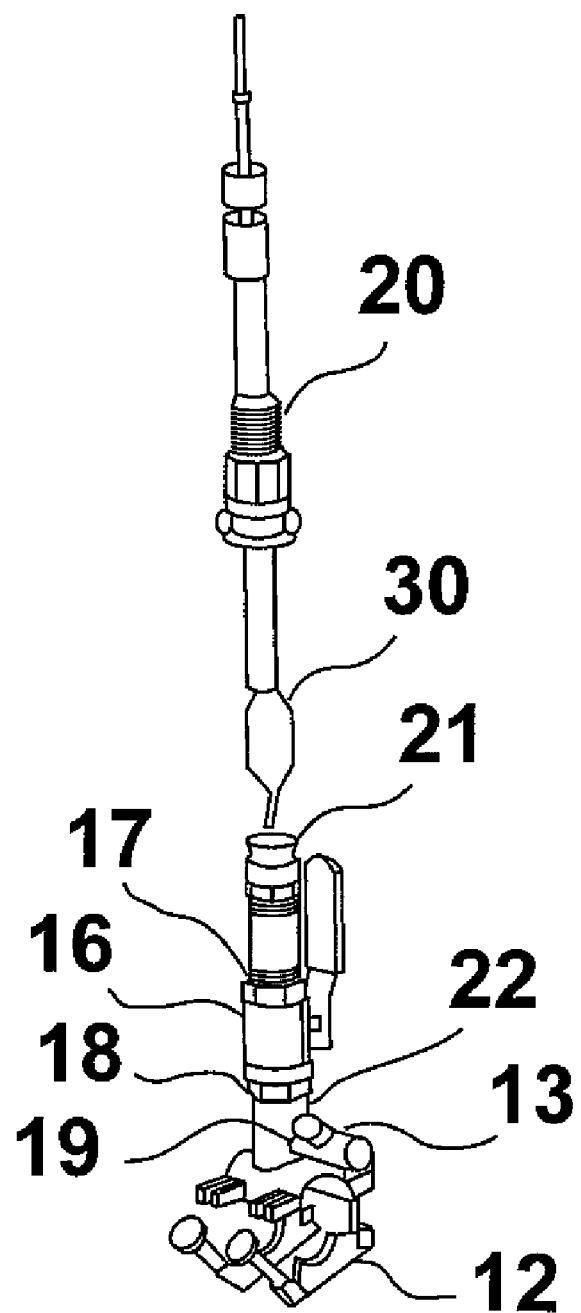
FIG. 2 is a diagram showing a partially disassembled view of an apparatus in accordance with one embodiment of this invention.

FIG. 1 shows a portion of the apparatus of this invention disposed around a service line or pipe 11 downstream of a gas meter 10 connected with the service line. As shown therein, the apparatus comprises saddle fitting 12, axially extending tubular connection element 22 connected with the saddle fitting and forming bypass port 19 through which a bypass gas supply is provided to service line 11 by way of a service tee 13 having a fluid inlet 14 in fluid communication with bypass port 19, valve assembly 16 having a valve outlet end 23 connected with axially extending tubular connection element 22, and stuffing box 21 connected with valve assembly inlet end 17 of valve assembly 16. It will be appreciated that, with valve assembly 16 in an open condition, a continuous passage is provided between stuffing box 21 and service line 11. Service tee 13 is provided with an additional opening 15 to which a metering device, pressure gauge, etc. may be connected for the purpose of monitoring the flow of the bypass gas supply.

Figure 3:
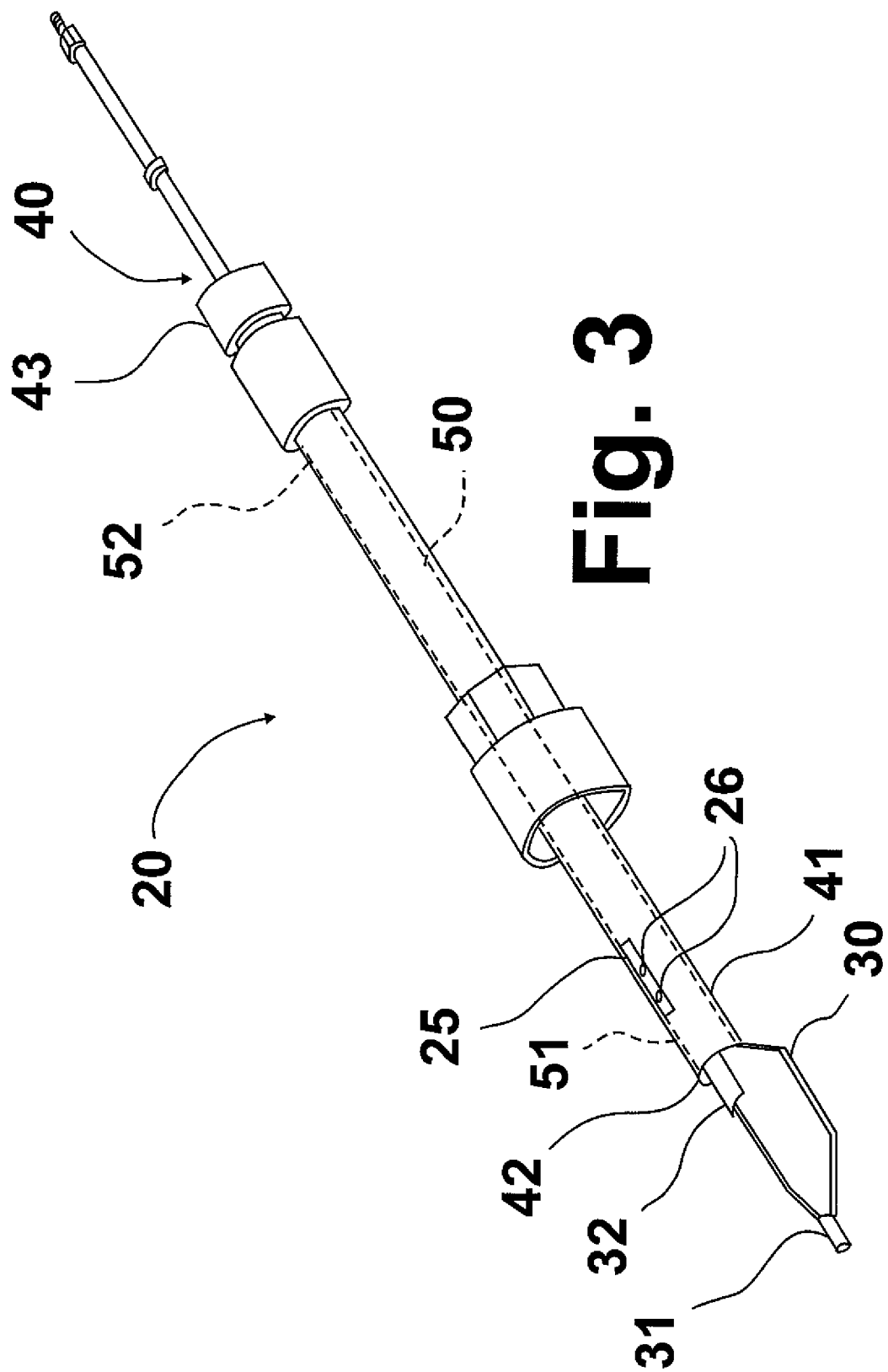
FIG. 3 is a perspective view of a launch tube assembly in accordance with one embodiment of this invention.
Figure 4:
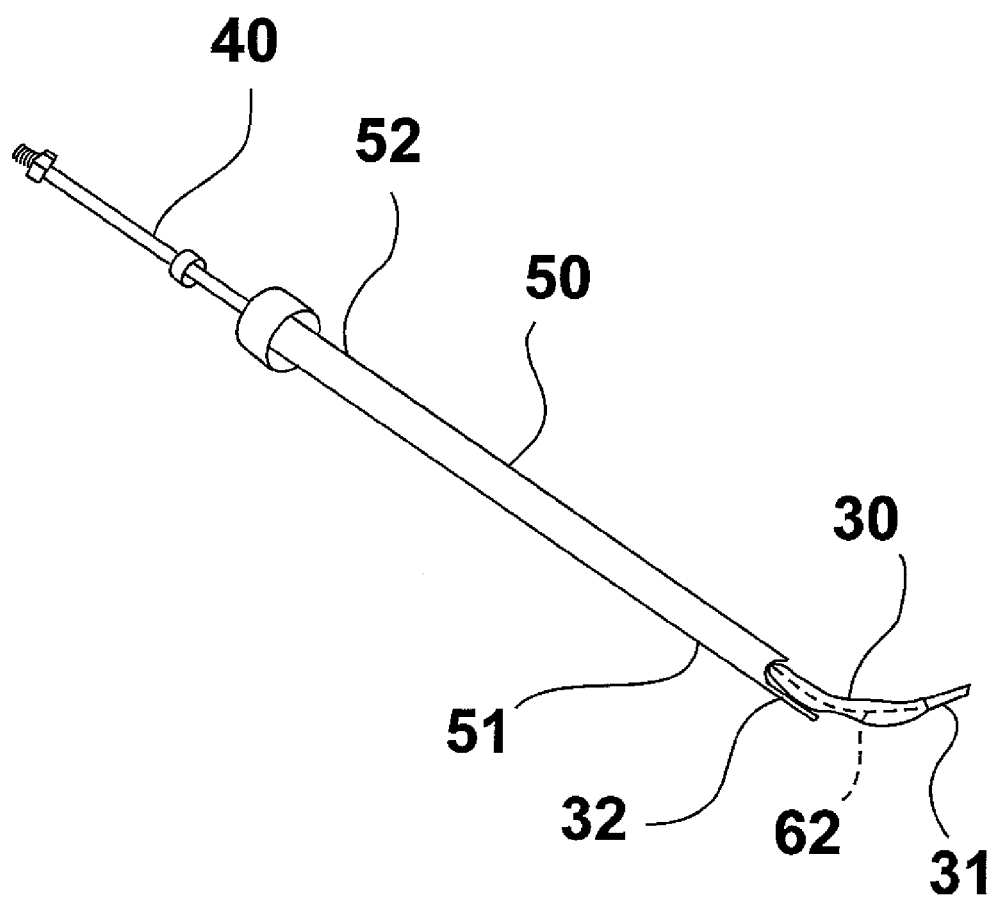
FIG. 4 is a perspective view of the inner tubular element of the launch tube assembly of FIG. 3.
Figure 5:
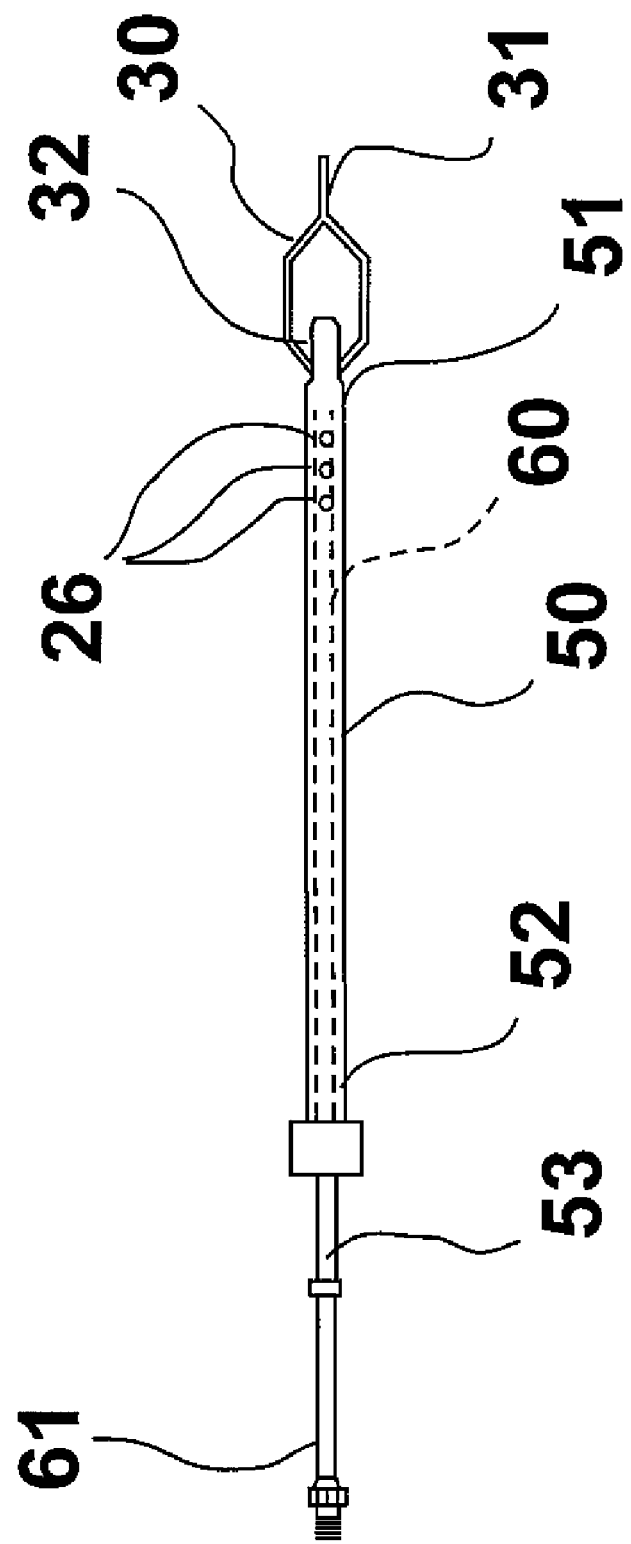
FIG. 5 is a plan view of the inner tubular element of the launch tube assembly of FIG. 3.
Figure 6:
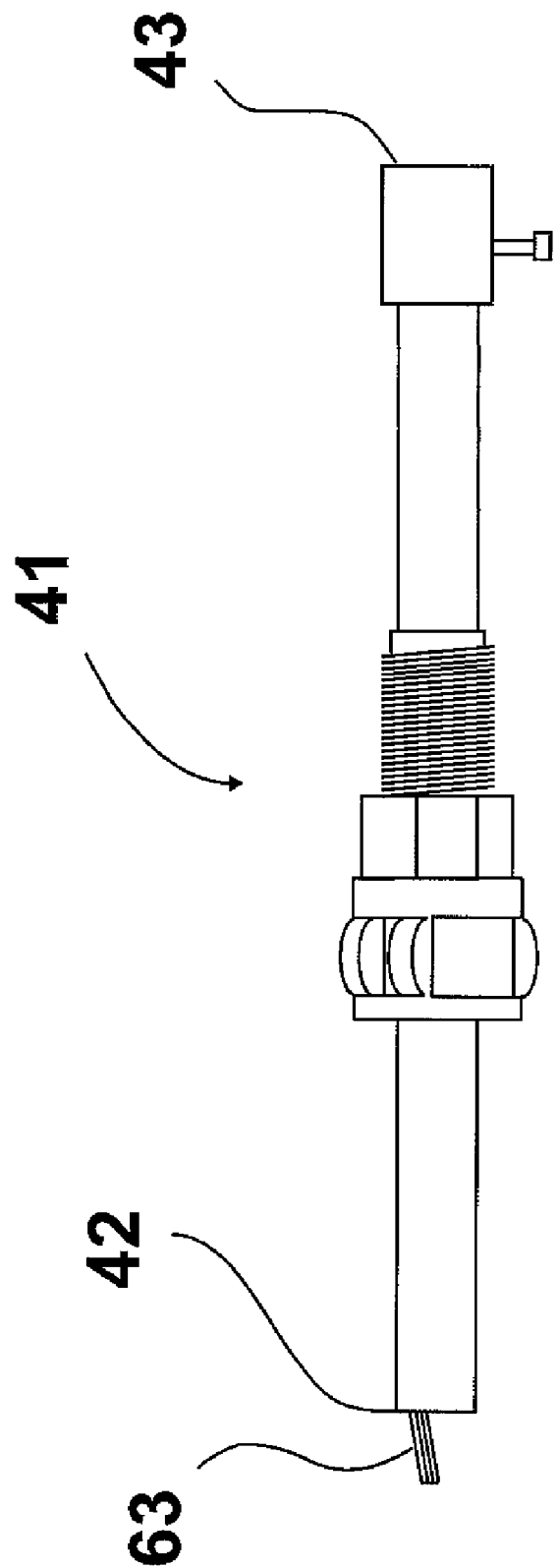
FIG. 6 is a lateral view of the outer tubular element of a launch tube assembly in accordance with one embodiment of this invention.
Figure 7:
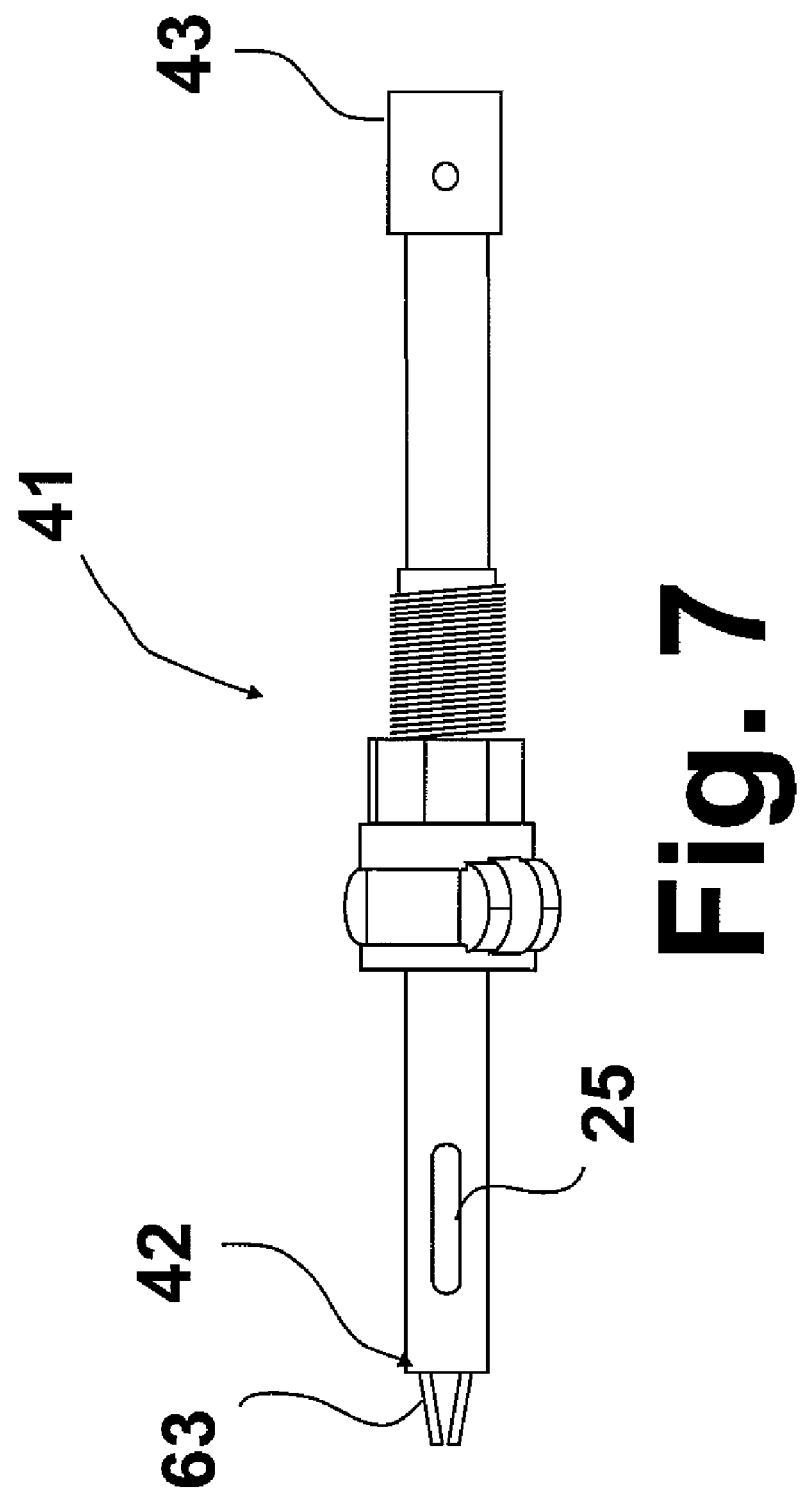
FIG. 7 is a view of the outer tubular element of FIG. 6 rotated 90° around a longitudinal axis thereof.

The crux of the apparatus of this invention lies with launch tube assembly 20, shown in various forms in FIGS. 2-7, which is inserted through stuffing box 21 and valve assembly 16 into service line 11 for stopping gas flow through service line 11 upstream of the saddle fitting after an opening has been provided in the service line by conventional means. Launch tube assembly 20 as shown in assembled form in FIG. 2 comprises outer tubular member 41 having inlet end 43 and outlet end 42 (FIG. 3). Outer tubular member 41 forms a bypass slot or opening 25, the purpose of which will be described in more detail herein below. Disposed within the outer tubular member is inner tubular member 50 (FIG. 4) having inlet end 52 distal outlet end 42 of outer tubular member 41 and outlet end 51 proximate outlet end 42 of outer tubular member 41. The inner tubular member forms at least one bypass opening 26 proximate outlet end 51 which aligns with bypass slot or opening 25 as shown in FIG. 3. As shown in FIGS. 3-5, inner tubular member 50 comprises a tongue-like extension 32 which extends beyond the outlet end 42 of outer tubular member 41.

Disposed within inner tubular member 50 is flow stopping means for stopping the flow of a fluid flowing through service line 11 to which the saddle fitting is connected. The flow stopping means comprises stoppage means for ensuring stoppage of the fluid flow upstream of the saddle fitting. It will be appreciated that stopping flow of the fluid upstream of the saddle fitting is critical to ensuring continuous bypass fluid flow to the customer through service line 11 downstream of the saddle fitting. Thus, it is critically important to be able to ensure that flow stoppage occurs upstream of the saddle fitting every time the apparatus is employed. In accordance with one embodiment of this invention, the flow stopping means comprises stopper supply tube 53 having a fluid supply tube inlet end 61 and fluid supply tube outlet end 60. The stopper supply tube provides a fluid, typically a gas, to a flexible inflatable bag 30 connected with the fluid supply tube outlet end, which bag, upon inflation stops fluid flow within the service line upstream of the saddle fitting. The flexible inflatable bag is provided with a guidance tip 31 for aiding in the proper location of the bag within the service line. In accordance with one embodiment of this invention, stiffening means, such as wire 62 as shown in FIG. 4, is connected with the flexible inflatable bag to stiffen the bag against total collapsing when introduced into the service line. Total collapsing of the bag substantially increases the difficulty associated with controlling disposition of the bag in the service line.

As previously indicated, in contrast to conventional systems, the apparatus of this invention provides means for ensuring that the flexible inflatable bag is always inserted and inflated upstream of the saddle fitting. In accordance with one embodiment of this invention, this directional control is achieved by at least one guidance pin 63 connected with and extending from the outlet end of the outer tubular member 41 of the launch tube assembly. When in use, the outer tubular member is oriented such that the at least one guidance pin is oriented towards the downstream side of the saddle fitting. As a result, if the flexible inflatable bag exiting the launch tube assembly for insertion into the service pipe is oriented toward the downstream side of the saddle fitting, the at least one guidance pin will prevent the bag from entering the service pipe, thereby notifying the user of the need to re-orient the bag for insertion upstream of the saddle fitting.

Inner tubular member 50 is preferably made of a flexible plastic material, such as polyethylene. The tongue-like extension of the inner tubular member is preferably oriented across from the at least one guidance pin. As a result, the tongue-like extension, which is somewhat flexible, can prevent the occurrence of damage to the flexible inflatable bag as it is withdrawn from the service pipe after completion of the meter change-out process, thereby enabling reuse of the flexible inflatable bag.

To ensure a continuous supply of gas to the customer, a source of gas, such as a container of compressed natural gas, is connected with fluid inlet 14 of service tee 13. The gas flows into the service tee and passes through the bypass port 14, the aligned bypass openings 25 and 26 of the outer tubular member and inner tubular member, and through the outlet end 51 of the inner tubular member into the service line.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A low pressure directional stop bypass device comprising:
   a saddle fitting having an axially extending tubular connection element having a bypass port;
   a valve assembly connected with said axially extending tubular connection element having a first valve port in fluid communication with said bypass port and having a second valve port;
   a stuffing box connected with said second valve port;
   a launch tube assembly inserted through said stuffing box and said valve assembly into said axially extending tubular connection element and comprising fluid communication means for providing fluid communication between an interior of said launch tube assembly and said bypass port; and
   flow stopping means for stopping flow of a fluid flowing through a pipe to which said saddle fitting is connected, said flow stopping means comprising stoppage means for ensuring stoppage of said fluid flow upstream of said saddle fitting.

2. The device of claim 1, wherein said launch tube assembly comprises an outer tubular member having an inlet end distal from said saddle fitting and an outlet end proximate said saddle fitting having an outlet opening in fluid communication with said pipe, a wall of said outer tubular member forming a bypass opening in fluid communication with said bypass port.

3. The device of claim 2, wherein said launch assembly comprises an inner tubular member disposed within said outer tubular member having an inner tubular outlet end proximate said saddle fitting having an inner tubular outlet opening in fluid communication with said pipe, an inner tubular member inlet end distal from said saddle fitting, a wall of said inner tubular member forming an inner bypass opening aligned with said bypass opening of said outer tubular member.

4. The device of claim 3, wherein said launch tube assembly comprises a stopper supply tube disposed within said inner tubular member having a leading end proximate said saddle fitting and a trailing end distal said saddle fitting, and a flexible inflatable stopper bag connected with said leading end.

5. The device of claim 4, wherein said stoppage means comprises at least one bag orientation pin connected with said outer tubular member proximate said outlet end and extending beyond said outlet end into said pipe.

6. The device of claim 4, wherein said flexible inflatable stopper bag comprises stiffening means for reducing, but not eliminating, unstiffened flexibility of said flexible inflatable stopper bag.

7. The device of claim 6, wherein said stiffening means comprises a solid wire disposed within said flexible inflatable stopper bag.

8. The device of claim 7, wherein said inner tubular member comprises a flexible tongue element extending from said inner tubular outlet end positioned substantially opposite and facing said at least one bag orientation pin.

9. A low pressure directional stop bypass device comprising:
   a saddle fitting having an axially extending tubular connection element having a connection element wall forming a lateral bypass port;
   a valve assembly connected with said axially extending tubular connection element having a first valve port in fluid communication with said lateral bypass port and having a second valve port;
   a stuffing box connected with said second valve port;
   a launch tube assembly inserted through said stuffing box and said valve assembly into said axially extending tubular connection element, said launch tube element comprising an outer tubular member, an inner tubular member disposed within said outer tubular member, and a stopper supply tube having a leading end and a trailing end and disposed within said inner tubular member;
   a flexible inflatable stopper plug connected with said leading end of said stopper supply tube;
   fluid communication means for providing fluid communication between an interior of said inner tubular member and said bypass port; and
   direction means for ensuring insertion of said flexible inflatable stopper plug into a pipe fitted with said saddle fitting in a predetermined direction.

* * * * *